Figure 1:
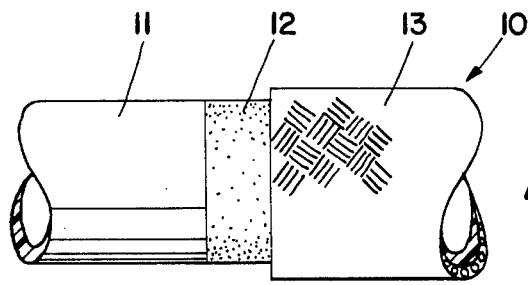

United States Patent [19]

Sullivan

[11] 3,988,189

[45] Oct. 26, 1976

[54] METHOD OF CONSTRUCTING A HOSE

[75] Inventor: Dennis W. Sullivan, Willoughby, Ohio

[73] Assignee: Parker-Hannifin Corporation, Cleveland, Ohio

[22] Filed: June 5, 1975

[21] Appl. No.: 584,208

Related U.S. Application Data

[63] Continuation of Ser. No. 397,175, Sept. 14, 1973, abandoned.

[52] U.S. Cl. .............................. 156/143; 138/124; 138/126; 138/127; 156/149; 156/172; 156/244; 156/305; 156/308; 264/103; 264/173

[51] Int. Cl.² ..................... B31C 13/00; B32B 1/08

[58] Field of Search.... 156/143, 149, 166, 172–173, 156/244, 278, 305–306; 138/123–127, 137, 141, 174, 176; 264/209, 103, 173

[56] References Cited
UNITED STATES PATENTS

| | | | |
|---|---|---|---|
| 226,038 | 3/1880 | Cowen | 156/149 |
| 2,478,939 | 8/1949 | Pape | 156/149 |
| 2,974,713 | 3/1961 | Hydrick, Jr. | 156/149 |
| 2,977,839 | 4/1961 | Koch | 156/149 |
| 3,253,618 | 5/1966 | Cook | 156/149 |
| 3,253,619 | 5/1966 | Cook et al. | 156/149 |
| 3,334,165 | 8/1967 | Koch | 156/149 |
| 3,413,169 | 11/1968 | Krings et al. | 156/149 |
| 3,603,719 | 9/1971 | Lejeune | 156/149 |
| 3,725,167 | 4/1973 | Love et al. | 156/143 |
| 3,809,590 | 5/1974 | Fantini et al. | 156/149 |

*Primary Examiner*—William A. Powell
*Assistant Examiner*—Thomas Bokan
*Attorney, Agent, or Firm*—John N. Wolfram

[57] ABSTRACT

A method of constructing a finished hose that includes a synthetic rubber core tube, comprising extruding the tube over a mandrel, completely curing the tube, applying a bonding agent to the tube, and applying reinforcement and covering over the tube so that it becomes bonded thereto, and removing the mandrel, whereby only the synthetic rubber core tube is subjected to the curing process.

2 Claims, 5 Drawing Figures

METHOD OF CONSTRUCTING A HOSE

This application is a continuation of Ser. No. 397,175, filed Sept. 14, 1973, now abandoned.

BACKGROUND OF THE INVENTION

One presently known method of making hoses that include a synthetic rubber tube and a covering of reinforcing and/or protective material is to extrude the rubber core tube onto a mandrel, apply the covering, envelope the covering with a lead sheath, and subject the entire assembly to vulcanization in a steam chamber. Vulcanizable rubber adhesives or bonding agents such as rubber cement or uncured calandared rubber sheet may be interposed between the tube and covering and generally are interposed between layers of a multilayer covering. This material becomes cured during the vulcanization of the assembly to bond the various constituents of the hose together, during the vulcanization of the synthetic rubber tube.

The bond between the different braids and synthetic rubber core tube achieved with this method has not been completely satisfactory or reliable and it has been difficult to hold the inside and outside diameters of the core tube to precise limits because of the application of the braid layers before complete curing of the rubber core tube. The processes involved require considerable investment in equipment for applying and stripping the lead sheath and for effecting vulcanization. The melting of lead and the handling of large amounts of lead also entail medical and physical hazards for the workmen involved.

SUMMARY OF THE INVENTION

According to the present invention, a hose construction that includes a synthetic rubber core tube with a covering or layer of reinforcing and/or a protective material is made by extruding the synthetic rubber core tube onto a mandrel, completely curing the tube by any conventional means, applying a bonding agent to the cured tube, and applying the covering over the bonding agent so as to become bonded to the tube to make a completely finished hose.

If the hose construction is to include more than one layer of reinforcing and/or protective materials, additional coatings of bonding agent are applied between the layers to be bonded to each other, all coatings and layers being applied after the synthetic rubber tube has been cured. Thus the hose is constructed by applying all bonding agents and reinforcing and/or protective layers after the synthetic rubber tube has been cured and without the use of lead sheathing or subjection of the bonding agents, reinforcements, or protective coverings to the curing process. After the hose is completed, the mandrel may be removed by conventional well known means.

DETAIL DESCRIPTION

Figure 2:
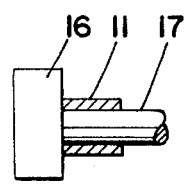
Figure 3:
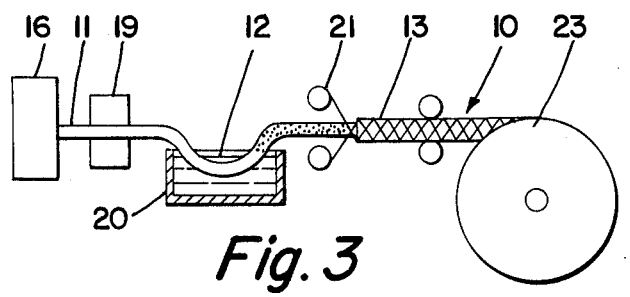
Figure 4:
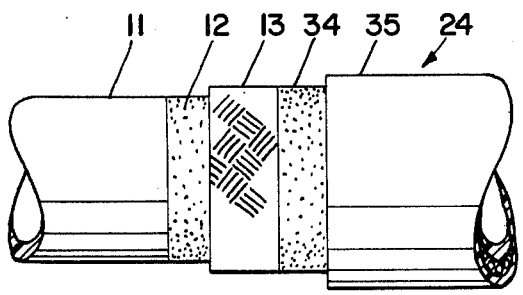
Figure 5:
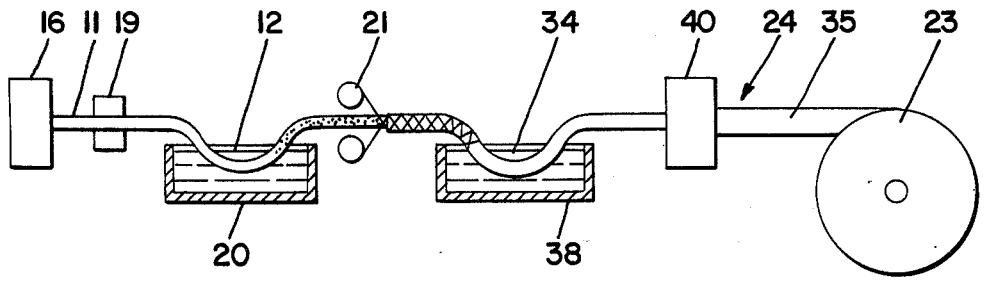

FIGS. 1 and 4 illustrate typical hose constructions.
FIG. 2 illustrates extrusion of a tube onto a mandrel.
FIGS. 3 and 5 illustrate the methods for making the hoses of FIGS. 1 and 4, respectively.

The hose 10 shown in FIG. 1 comprises a synthetic rubber core tube 11, an adhesive 12, and a braided yarn covering 13. The method of constructing hose 10 by the method of the present invention is illustrated in FIGS. 2 and 3. Core tube 11 is first extruded by a conventional extruder 16 onto a mandrel 17 as shown in FIG. 2. The tube and mandrel are then set into or preferrably passed through a curing oven 19 for completely vulcanizing the core tube, as shown in FIG. 3. From oven 19, the tube passes into a tank 20 of a bonding agent 12 and then through a mechanism 21 that applies the layer of covering 13. The hose may then be wound upon a reel 23 and when the bonding agent, if an adhesive, has aged sufficiently, the mandrel is removed and the hose is then ready for use.

The hose 24 of FIG. 4 comprises a synthetic rubber core tube 11, an adhesive 12, a first layer of reinforcement 13, another layer of bonding agent 34, and a plastic sheath 35. The method for making hose 24 by the present invention is illustrated in FIGS. 2 and 5. The synthetic rubber core tube 11 is first extruded onto a mandrel 17, as shown in FIG. 2 and then passed into oven 19 for completely vulcanizing the tube, as shown in FIG. 3. From oven 19, the tube passes into a tank 20 containing a bonding agent 12 and then to a reinforcement machine 21 that applies a layer of reinforcement 13 that becomes adherent to tube 11 through the means of bonding agent 12. It then passes into another tank 38 of an adhesive 34 which may be the same as bonding agent 12, if the latter is an adhesive, and then to a cross-head extruder 40 which extrudes a plastic sheath 35 that becomes adhered to reinforcement 13 by adhesive 34. As before, the hose may then be wound upon a reel 23 and after the bonding agents, if adhesives, and the plastic sheath have aged sufficiently, the mandrel is removed and the hose is ready for use. In some cases it may be desirable to omit bonding one or more layers of reinforcement and/or sheath to either the tube or some other layer, in which case the bonding agent for such layer is omitted.

The mandrel which serves to support and control the inside diameter of the synthetic rubber core tube throughout the process for making the hose is preferrably a flexible mandrel made from a plastic or elastomer sufficiently resistant to the temperature, chemical, and physical stresses that it is subjected to.

Examples of such plastics are nylon, polypropylene, styrene-butadiene, copolymer, or ethylene-propylene-diene terpolymer. The synthetic rubber core tube may be made of a compound based upon copolymerized acrylonitrile and butadiene, polymerized chloroprene, or other material or synthetic rubber useful as a conduit for fluids.

The oven 19 may be an autoclave containing high pressure steam, a bath of molten salt, a fluidized bed of heated particles such as glass or sand, or a device for directing electromagnetic microwaves through the synthetic rubber core tube.

The bonding agent 12 may be a solvent such as toluene or other aromatic hydrocarbon for tackifying a polychloroprene core tube. The bonding agent 12 may optionally be an adhesive such as Epon 872X75 and AEP cure, an epoxy resin manufactured by Shell; a 50—50 blend of 1024 and 1049, a nitrile and phenolic resin blend manufactured by Polymer Chemical; A544B, a synthetic rubber cement manufactured by Goodrich; Adiprene L-100, a urethane base adhesive manufactured by E. I. DuPont de Nemours and Co., Chemloc 218, an organic resin manufactured by Hughson Chemical; NM-2, a polychloroprene cement manufactured by the Whittaker Corporation, or other material suitable for the degree of bonding required.

The reinforcement 13 may be nylon, polyester, cotton, wire or other material. The reinforcement configuration may be braided, knit or spiraled.

Other combinations of synthetic rubber, reinforcements, and sheath, and materials for the same may be employed. The essential step is the complete curing of the synthetic rubber core tube prior to application of the bonding materials, reinforcement layers, and sheathing.

An exception can be made if the synthetic rubber core tube is to have a plastic liner. In such cases, the liner, which may be nylon or the like, may be extruded onto a mandrel or extruded without a mandrel, depending upon the type of material and wall thickness. When no other mandrel is used, the liner itself serves as a mandrel for the synthetic rubber core tube. The synthetic rubber is then extruded over the liner and this much of the assembly is passed through the vulcanization chamber for curing the synthetic rubber and causing it to be adhered to the liner. The completely cured synthetic rubber tube and liner are then passed through processes to receive bonding agents, layers of reinforcement, and sheathing materials as heretofore described.

The mandrel or compression-resistant thermoplastic liner in all cases determines the inside diameter of the hose. Curing of the synthetic rubber tube before application of reinforcement or sheathing layers substantially fixes both the inside diameter and the outside diameter of the rubber tube. Thus the application of the reinforcement or sheathing layers may be controlled so that the final inside and outside diameters on the finished hose may be accurately established without requiring both a mandrel and an external removable sheath of lead or other materials which do not become part of the final product.

I have found a number of other advantages over the older method, possessed by the concept of a hose construction in which the synthetic rubber core tube is completely vulcanized before building up additional layers, some of which would not be self-evident to those skilled in the art. The core tube can achieve maximum dimensional and physical control, since no additional operations are performed upon it while it is in an unstable dimensional state prior to vulcanization.

The natural resilience of the synthetic rubber core tube, having been established prior to placement of the tensioned reinforcing members upon it, the tensioned reinforcing members and the core tube have a mutually resistive effect which enhances the development of a maximum bond between the reinforcement and the core tube. This compares very favorably to the less competitive contact between core tube and reinforcement in the known art where the reinforcement is applied before the core tube is vulcanized. In the latter case, the core tube tends to yield and flow, allowing the reinforcement to embed itself lightly into the surface of the core tube but not resisting so much and therefore not generating as intimate a contact between core tube and reinforcement.

Also, the pre-cured core tube has a strong capability of resisting penetration, should one or more strands of the reinforcement be applied with too high a tension from poor adjustment of the reinforcing equipment or because a snarl in the reinforcement material has occurred. In addition, even under the best adjustment practicable in the machinery which applies the reinforcement, the conventional uncured synthetic rubber core tube is actually reduced in wall thickness approximately 5% but in a varying amount along the length of the tube because of variations in the tension of reinforcement and variations in the viscosity of the semoliquid uncured synthetic rubber caused in turn by variations in the constituents, head and processing history, and its exact temperature at the time.

Additional advantages to the use of a fully cured core tube are that bonding agents may be selected outside the range which can be subjected to vulcanization and that the fungicide treatment, if used, is not required to survive the vulcanization process in intimate contact with a lead sheath.

I claim:

1. The method of constructing a hose comprising in sequence as a continuous process the steps of extruding a core tube of synthetic rubber over a mandrel whereby the mandrel will control the inside diameter of the core tube throughout the remainder of the process, completely curing the core tube by application of heat to the core tube and mandrel, applying a bonding agent to the tube after the tube is completely cured, and applying a reinforcement over the tube in a manner to effect a bond of the core tube to the reinforcement via the bonding agent and whereby neither the bonding agent nor the reinforcement is subjected to said heat.

2. The method of constructing a hose comprising in sequence as a continuous process the steps of extruding a core tube of synthetic rubber over a mandrel whereby the mandrel will control the inside diameter of the core tube throughout the remainder of the process, completely curing the tube by application of heat to the tube and mandrel, applying a first coating of bonding agent to the exterior of the tube after the tube is completely cured, applying a first reinforcement layer of cotton braid over the tube to be adhered thereto by said bonding agent, applying a second reinforcement layer comprising stainless steel braid over the first layer, applying a second coating of bonding agent to the second layer so as to penetrate the interstices thereof to make contact with the first layer, and applying an upper layer of cotton braid over the second layer into contact with said second coating whereby the coatings bond the three layers together and said heat is not applied to the bonding agents or reinforcement.

* * * * *